United States Patent Office 2,754,244
Patented July 10, 1956

2,754,244
NEW PHOSPHORIC ACID ESTERS

Hans Gysin and Alfred Margot, Basel, Switzerland, assignors to J. R. Geigy A. G., Basel, Switzerland, a Swiss firm No Drawing. Application July 16, 1953,
Serial No. 368,490

Claims priority, application Switzerland April 20, 1951

5 Claims. (Cl. 167—33)

The present application is a continuation-in-part of application Serial No. 280,662.

The present invention concerns new phosphoric acid esters of the general formula:

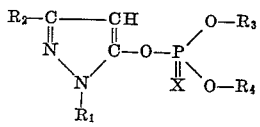

wherein $R_1$ represents a member selected from the group consisting of hydrogen, alkyl, alkenyl and monocyclic aryl, $R_2$ represents a member selected from the group consisting of hydrogen and methyl, $R_3$ and $R_4$ represent lower alkyl radicals, and X represents a member selected from the group consisting of oxygen and sulphur.

It has now been found that such compounds have a very good insecticidal and acaricidal activity and, as active ingredients, are excellently suitable for the production of agents for the control of pests, in particular for the control of aphids and acarids. The new compounds are active both as contact poisons and systemic insecticides. They are distinguished from the most active aromatic-aliphatic phosphoric acid esters such as p-nitrophenyl-diethyl-thiophosphoric acid ester partly by their slighter toxicity to worm blooded animals and partly by their stronger systemic action.

Many of the compounds according to the present invention have a cholinesterase-inhibitant action and are suitable, therefore, for the production of pharmaceutical preparations.

The new compounds can be produced by reacting an aliphatic phosphoric acid diester halide or a thiophosphoric acid diester halide of the general formula:

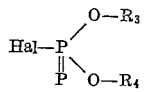

wherein Hal represents chlorine or bromine and $R_3$ and $R_4$ have the meanings given above, with a pyrazolone compound of the general formula:

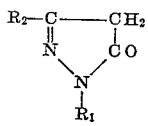

wherein $R_1$ and $R_2$ have the meanings given above, or with a salt of the enol form of such a compound.

The reactions may be performed in either the presence or absence of inert solvents such as benzene, toluene, dioxan or ethyl acetate. It is advantageous to add acid binding agents such as sodium carbonate or potassium carbonate when free pyrazolones are used. The alkali salts are particularly suitable as salts of the enol forms.

A number of pyrazolones which come into consideration are given below:

Pyrazolone-(5), 3-methyl-pyrazolone-(5), 1-ethyl-pyrazolone-(5), 1,3-dimethyl-pyrazolone-(5), 1-ethyl-3-methyl-pyrazolone-(5), 1-isopropyl-3-methyl-pyrazolone-(5), 1-isoamyl-3-methyl-pyrazolone-(5), 1-n-hexyl-3-methyl-pyrazolone-(5), 1-allyl-1-pyrazolone-(5), 1-allyl-3-methyl-pyrazolone-(5), 1-phenyl-pyrazolone-(5), 1-phenyl-3-methyl-pyrazolone-(5), 1-(m-chlorophenyl)-3-methyl-pyrazolone-(5), 1-(p-nitrophenyl)-3-methyl-pyrazolone-(5), 1-(p-nitrophenyl)-3-methyl-pyrazolone-(5) and 1-(m.p-dichlorophenyl)-3-methyl-pyrazolone-(5).

Most of the phosphoric acid diester halides used as starting materials are already known. The others can be produced in an analogous manner, e. g. by reacting phosphorus oxyhalides or phosphorus thiohalides with 2 mols of the corresponding alcohols or metal compounds thereof or some may be produced by sulphurisation of the corresponding phosphorous acid diester halides.

As individual phosphoric acid diester halides may be listed: phosphoric acid or thiophosphoric acid dimethylester chloride, -methyl-ethylester chloride, -diethylester chloride, -diethylester bromide, -dipropylester chloride, -di-isopropylester chloride, -dibutylester chloride and -di-amylester chloride.

The following example illustrates further the production of the new compounds. Parts are always given as parts by weight and the temperatures are in degrees centigrade.

Example 1

49 parts of 3-methyl-pyrazolone-(5) are neutralised with the calculated amount of sodium carbonate solution (e. g. 280 parts of 2 N solution) and the solution is evaporated to dryness. The thoroughly dried salt is added to 500 parts of abs. benzene and then 95 parts of diethyl thiophosphoric acid chloride are added while stirring. The reaction mixture is heated at 100–110° for some hours and then the sodium chloride which has formed is filtered off. Any unchanged starting materials are removed by shaking out the reaction product with sodium carbonate solution. After distilling off the toluene, 3-[methyl-pyrazolyl-(5)]-diethyl thiophosphoric acid ester is obtained. It cannot be distilled without decomposition but is, however, suitable for the production of agents for controlling pests without any further purification.

The compounds shown in the following table can be produced in an analogous manner.

2,754,244

TABLE

General formula:

$$\begin{array}{c} R_2-C\!=\!\!=\!\!CH \\ \phantom{R_2-}N\phantom{=C}CH-O-P\!\!=\!\!X\!\!\begin{array}{c}O-R_3\\O-R_4\end{array} \\ \phantom{R_2-}\underset{R_1}{N} \end{array}$$

| No. | $\begin{array}{c}R_2-C\!=\!\!=\!\!CH\\ \phantom{R_2-}N\phantom{=C}CH-O-\\ \phantom{R_2-}\underset{R_1}{N}\end{array}$ | $-\underset{\underset{X}{\|\|}}{P}\!\!\begin{array}{c}O-R_3\\O-R_4\end{array}$ | | |
|---|---|---|---|---|
| 1 | HC=CH, C-O-, N=N, NH | $-\underset{\underset{S}{\|\|}}{P}(-O-C_2H_5)_2$ | | |
| 2 | HC=CH, C-O-, N=N, N-CH_3 | $-\underset{\underset{O}{\|\|}}{P}(O-C_2H_5)_2$ | | |
| 3 | HC=CH, C-O-, N=N, N-C_6H_5 | $-\underset{\underset{S}{\|\|}}{P}(-O-C_2H_5)_2$ | | |
| 4-5 | CH_3-C=CH, C-O-, N=N, NH | $-\underset{\underset{O}{\|\|}}{P}(-O-C_2H_5)_2$ | $-\underset{\underset{O}{\|\|}}{P}(-O-C_4H_9)_2$ | |
| 6-7 | CH_3-C=CH, C-O-, N=N, N-C_2H_5 | $-\underset{\underset{S}{\|\|}}{P}(-O-CH_3)_2$ | $-\underset{\underset{S}{\|\|}}{P}(-O-C_2H_5)_2$ | |
| 8-9 | CH_3-C=CH, C-O-, N=N, N-CH(CH_3)_2 | $-\underset{\underset{S}{\|\|}}{P}(-O-CH_3)_2$ | $-\underset{\underset{S}{\|\|}}{P}(-O-C_2H_5)_2$ | |
| 10 | CH_3-C=CH, C-O-, N=N, N-CH_2-CH_2-CH(CH_3)_2 | $-\underset{\underset{O}{\|\|}}{P}(-O-C_2H_5)_2$ | | |
| 11-12 | CH_3-C=CH, C-O-, N=N, N-CH_2-CH=CH_2 | $-\underset{\underset{S}{\|\|}}{P}(-O-CH_3)_2$ | $-\underset{\underset{S}{\|\|}}{P}(-O-C_2H_5)_2$ | |
| 13-15 | CH_3-C=CH, C-O-, N=N, N-C_6H_5 | $-\underset{\underset{O}{\|\|}}{P}(-O-C_2H_5)_2$ | $-\underset{\underset{S}{\|\|}}{P}(-O-CH_3)_2$ | $-\underset{\underset{S}{\|\|}}{P}(-O-C_2H_5)_2$ |
| 16 | CH_3-C=CH, C-O-, N=N, N-C_6H_4-CH_3 | $-\underset{\underset{S}{\|\|}}{P}(-O-C_2H_5)_2$ | | |

General formula:

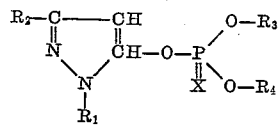

| No. | $R_2\text{-}C=N\text{-}N(R_1)\text{-}CH(\text{-}O\text{-})\text{=}C$ part | $-P(=X)(O\text{-}R_3)(O\text{-}R_4)$ part |
|---|---|---|
| 17 | CH₃-C=N-N(-)-C(-O-)=CH, N-substituent = 2,4-dichlorophenyl | $-P(=S)(-O-C_2H_5)_2$ |
| 18 | CH₃-C=N-N(-)-C(-O-)=CH, N-substituent = 4-nitrophenyl | $-P(=S)(-O-C_2H_5)_2$ |

The biological properties of the new compounds can be applied in the most varied fields of pest control and the nature of the compositions used can be varied accordingly. The active compounds can be used as such, e. g. in the form of powder or dispersed in the atmosphere as gas, mist or smoke. However, for most purposes it is more economical to combine them with suitable carriers or diluents. A number of such substances, suitable for the usual forms of application such as compositions for dusting or spraying (suspensions), solutions, aerosols, emulsions and semi-solid preparations (ointments) are listed below:

Thus as solid, pulverulent carriers may be used, e. g.: calcium carbonate in the form of whiting or ground limestone, kaolin, bole, bentonite, talcum, powdered magnesia, kieselguhr, boric acid, tricalcium phosphate, also powdered wood, powdered cork and other materials of a vegetable nature. By adding wetting agents and protective colloids such pulverulent preparations may be made to give suspensions in water suitable for use as spraying agents. The active substances may be combined with the carriers by, e. g., impregnating the latter with solutions of the active agents, by mixing the liquid active substances with the carriers or by milling the components together.

Solutions (for spraying) in high boiling solvents, such as kerosene and similar mineral oil fractions or in methylnaphthalenes, xylenes and the like, are best suited for the direct spraying of the object treated, but also for impregnating wood. Solutions in low boiling solvents such as trichloroethylene, tetrachlorethane, ethylene chloride are suitable for spreading the active ingredient in the form of a mist. The latter solvents as well as e. g. benzine, xylene and chlorobenzene are also suitable in the impregnation of packing materials.

Fluoro-trichloromethane and difluoro-dichloromethane are examples of solvents and propellent agents suitable for use in aerosols.

As emulsifying agents there come into consideration those of a cation active nature, such as quaternary ammonium compounds, as well as anion active agents such as soap, resin soap, soft soap, caseinate, aliphatic monoesters of sulphuric acid and aliphatic aromatic sulphonic acids, furthermore, non-ionogenic emulsifiers such as high molecular condensation products of ethylene oxide. They are mixed with the active ingredients to form emulsion concentrates or are emulsified to form dilutable emulsion concentrates with or without the addition of suitable solvents such as e. g. acetone, alcohols, cyclohexanone, benzene, toluene, xylene, tetrahydronaphthalene, alkylated napthalenes, phthalic acid esters, mineral and vegetable oils and, if required, water.

White petroleum jelly and other ointment bases in which the active ingredient can be incorporated are suitable semi-solid extenders.

The active compounds may also be used together with attractives or lures such as sugar to form a bait, for instance as a dusting agent with sugar as the main carrier, or as sprays or fly catchers.

The different formulations can be better adapted for the various uses intended in the usual way, i. e., by the admixture of additives improving the distribution, adhesive power and resistance to rain on the treated surface. Examples of such additives are fatty acids, resins, artificial resins, wetting agents, glue, casein, blood albumin, sulphite waste liquor or alginates. Similarly, their biological activity can be extended by the addition of substances with bactericidal, fungicidal or insecticidal properties.

As bactericides there come into consideration, for example, chlorinated phenols and quaternary ammonium compounds, suitable fungicides include e. g. sulphur in all its various forms of application such as lime sulphur liquid, copper compounds such as copper oxychloride or Bordeaux liquid, and fluorides. As examples of further insecticidal compounds there may be named: synthetic products like 1.1-bis-(p-chlorophenyl)-2.2.2-trichlorethane, γ-hexachlorocyclohexane, hexaethyl tetraphosphate, tetraethyl pyrophosphate, chlorinated camphene and 1.2.4.5.6.7.8.8-octachloro-4.7.-methano-3a.4.7.7a - tetrahydroindane and 5.5-dimethyl-dihydroresorcinol dimethyl carbamate; suitable vegetable products are pyrethrin and rotenone.

In the following examples, parts are always given as parts by weight.

*Example 2*

Dusting agent.—1 part of active ingredient is homogeneously ground with 99 parts of a carrier such as e. g. talcum. If desired, adhesives to improve the adhesive properties of the dusted coating on plants may be added.

*Example 3*

Suspension spraying agent.—10 parts of active ingredient and 10 parts of solid pulverised residue of sulphite waste liquor are homogeneously ground with 80 parts of carrier. Should a greater wetting action be required, the sulphite waste liquor residue can be replaced by 5 parts of the sodium salt of dibutylnaphthalene sulphonic acid and 5 parts of blood albumin. The carrier may consist of one or a mixture of several of the following substances: chalk, kaoline, bentonite, etc.

*Example 4*

Emulsion.—20 parts of active ingredient are dissolved in 40 parts of a solvent and mixed with 40 parts of an emulsifying agent. Mixtures of benzene, toluene, xylene, acetone, lower aliphatic alcohols, petroleum distillates may, for example, be used as solvent. The emulsifiers may be anion active, cation active or non-ionogenic. As examples may given: sulphonates of fatty acid esters, the sulphonate of ricinoleic acid butyl ester, quaternary compounds or the condensation products of ethylene oxide and alkyl phenols or fatty alcohols. The concentrates can be emulsified into ready-for-use emulsions with water.

*Example 5*

Solution (spray).—1 part of active ingredient either as such or after the addition of a solvent, e. g. an aromatic hydrocarbon, is dissolved in 99 parts of petroleum distillate. (Boiling point 180–220°.)

What we claim is:

1. A phosphoric acid ester corresponding to the formula:

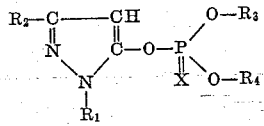

wherein $R_1$ represents a member selected from the group consisting of hydrogen, lower alkyl, lower alkenyl, phenyl, methylphenyl, chlorophenyl and nitrophenyl, $R_2$ represents a member selected from the group consisting of hydrogen and methyl, $R_3$ and $R_4$ represent lower alkyl radicals, and X represents a member selected from the group consisting of oxygen and sulphur.

2. A pesticidal composition consisting essentially of a phosphoric acid ester of the formula:

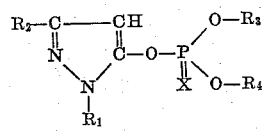

wherein $R_1$ represents a member selected from the group consisting of hydrogen, lower alkyl, lower alkenyl, phenyl, methylphenyl, chlorophenyl and nitrophenyl, $R_2$ represents a member selected from the group consisting of hydrogen and methyl, $R_3$ and $R_4$ represent lower alkyl radicals, and X represents a member selected from the group consisting of oxygen and sulphur, in combination with a pesticide carrier.

3. Diethyl-[3-methyl-pyrazolyl-(5)]-phosphate.

4. O.O-diethyl-O-[3 - methyl - pyrazolyl-(5)]-thiophosphate.

5. O.O-diethyl-O-[1-phenyl-3-methyl - pyrazolyl - (5)]-thiophosphate.

No references cited